US012594513B2

(12) United States Patent
Horng

(10) Patent No.: US 12,594,513 B2
(45) Date of Patent: Apr. 7, 2026

(54) ROTATABLE FILTER

(71) Applicant: ROCKER SCIENTIFIC CO., LTD.,
Kaohsiung City (TW)

(72) Inventor: Shui-Tien Horng, Kaohsiung City
(TW)

(73) Assignee: ROCKER SCIENTIFIC CO., LTD.,
Kaohsiung City (TW)

( * ) Notice: Subject to any disclaimer, the term of this
patent is extended or adjusted under 35
U.S.C. 154(b) by 380 days.

(21) Appl. No.: 18/533,876

(22) Filed: Dec. 8, 2023

(65) Prior Publication Data

US 2024/0216842 A1      Jul. 4, 2024

(30) Foreign Application Priority Data

Dec. 29, 2022      (TW) .................................. 111150644

(51) Int. Cl.
| | |
|---|---|
| *B01D 33/74* | (2006.01) |
| *B01D 33/06* | (2006.01) |
| *B01D 33/37* | (2006.01) |
| *B01D 35/157* | (2006.01) |

(52) U.S. Cl.
CPC ............. *B01D 33/74* (2013.01); *B01D 33/06*
(2013.01); *B01D 33/37* (2013.01); *B01D*
*35/1573* (2013.01)

(58) Field of Classification Search
CPC ........ B01D 33/74; B01D 33/06; B01D 33/37;
B01D 35/1573
USPC ....... 210/359, 365, 361, 782, 784, 450, 455,
210/458, 471, 492, 473
See application file for complete search history.

(56) References Cited

U.S. PATENT DOCUMENTS

| | | | | |
|---|---|---|---|---|
| 3,583,230 A | * | 6/1971 | Patterson | ............... G01N 30/24 |
| | | | | 436/177 |
| 11,338,228 B2 | | 5/2022 | Born et al. | |
| 2011/0104026 A1 | * | 5/2011 | Yoon | ................... B01L 3/50255 |
| | | | | 422/527 |

FOREIGN PATENT DOCUMENTS

| | | |
|---|---|---|
| CN | 108889136 A | 11/2018 |
| CN | 112055618 A | 12/2020 |
| TW | M505969 U | 8/2015 |

OTHER PUBLICATIONS

Search Report appended to an Office Action, which was issued to
Taiwanese counterpart application No. 111150644 by the TIPO on
Sep. 5, 2023, with an English translation thereof.

* cited by examiner

*Primary Examiner* — Madeline Gonzalez

(57) ABSTRACT
A rotatable filter includes a base unit, a rotating unit and an
external unit. The base unit includes a seat having a through
hole, and a container disposed on the seat, corresponding in
position to the through hole and having a drainage space.
The rotating unit is disposed on the base unit and includes
a rotating disc mounted on the seat and having a rotating part
that is rotatable relative to the seat, a converging seat
connected to the rotating part and having a collecting space
that is in fluid communication with the drainage space, a
plurality of guiding pipes extending into the converging seat,
and a plurality of valve seats respectively disposed on the
guiding pipes. The external unit is connected to the rotating
unit and includes a rotating cover disposed above the seat,
and a plurality of filtering modules disposed on the rotating
cover.

8 Claims, 6 Drawing Sheets

ROTATABLE FILTER

CROSS-REFERENCE TO RELATED APPLICATION

This application claims priority to Taiwanese Invention Patent Application No. 111150644, filed on Dec. 29, 2022, the entire disclosure of which is incorporated by reference herein.

FIELD

The disclosure relates to a filter, and more particularly to a rotatable filter.

BACKGROUND

A conventional sample collector 1 as shown in FIG. 1 includes a seat 11, and six receiving units 12. The seat 11 includes two support plates 111 spaced apart from each other, and a main pipe 112 disposed between the support plates 111 and surrounding and defining a connecting space 100. The receiving units 12 are disposed on the seat 11, are spacedly arranged along an extending direction of the seat 11, and are in fluid communication with the connecting space 100. The main pipe 112 has six through holes 101 in fluid communication with the connecting space 100 and open toward the receiving units 12, respectively, and two ports 102 respectively disposed on opposite ends of the main pipe 112. Each of the receiving units 12 includes a connecting tube 121 extending through the corresponding one of the connecting holes 101, and a receiving seat 122 connected to the connecting tube 121 and surrounding and defining a receiving space 120 that is for accommodating a filter funnel 20 therein.

When the conventional sample collector 1 is used to filter and collect a sample for subsequent analysis, one of the ports 102 of the main pipe 112 is connected to a vacuum suction device (not shown) and the receiving seat 122 of each of the receiving units 12 is adapted to accommodate a filter funnel 20, so that the sample, which may be in fluid form, in the filter funnels 20 is drawn to a collecting space after being filtered to await follow-up analysis. With the trend of the industry moving towards high efficiency and processing in large amounts, one of the ports 102 of the conventional sample collector 1 may be connected to a port 102 of another conventional sample collector 1 to realize a series connection of multiple sample collectors for processing a greater amount of the sample within the same time frame.

Although the sample collectors 1 are able to interconnect with one another in series to satisfy greater processing demand, the total length of the series-connected sample collectors 1 requires more space and is inconvenient for users in the sense that the users have to move back and forth on a route parallel to the series-connected sample collectors 1 in order to access each of the receiving units 12, which makes the operation not user-friendly.

SUMMARY

Therefore, an object of the disclosure is to provide a rotatable filter that can alleviate at least one of the drawbacks of the prior art.

According to the disclosure, the rotatable filter includes a base unit, a rotating unit and an external unit. The base unit includes a seat having a through hole, and a container disposed on the seat, corresponding in position to the through hole and having a drainage space. The rotating unit is disposed on the base unit and includes a rotating disc that is mounted on the seat and that has a rotating part which is rotatable relative to the seat, a converging seat that is connected to the rotating part of the rotating disc and that has a collecting space which is in fluid communication with the drainage space, a plurality of guiding pipes that extend into the converging seat and that are in fluid communication with the collecting space, and a plurality of valve seats that are respectively disposed on the guiding pipes. The external unit is connected to the rotating unit and includes a rotating cover that is disposed above the seat, that is rotatable together with the rotating part about a central axis and that has an accommodating space for accommodating the rotating unit, and a plurality of filtering modules that are disposed on the rotating cover. The rotating cover includes a plurality of receiving slots that surround the central axis, that are spaced apart from each other and that are respectively in fluid communication with the valve seats. The filtering modules are detachably and respectively disposed on the receiving slots.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
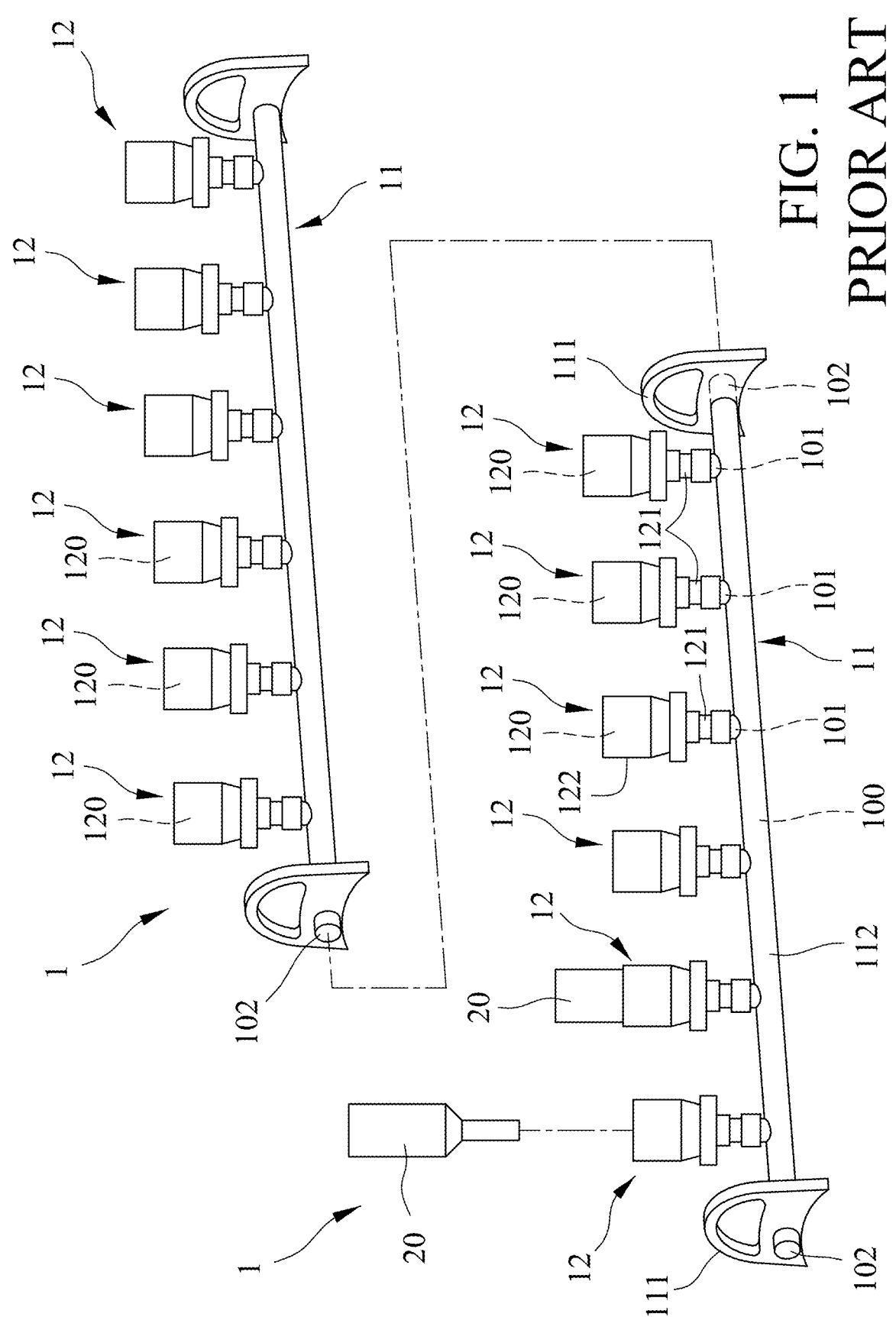
FIG. 1 is a perspective view illustrating a conventional sample collector.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
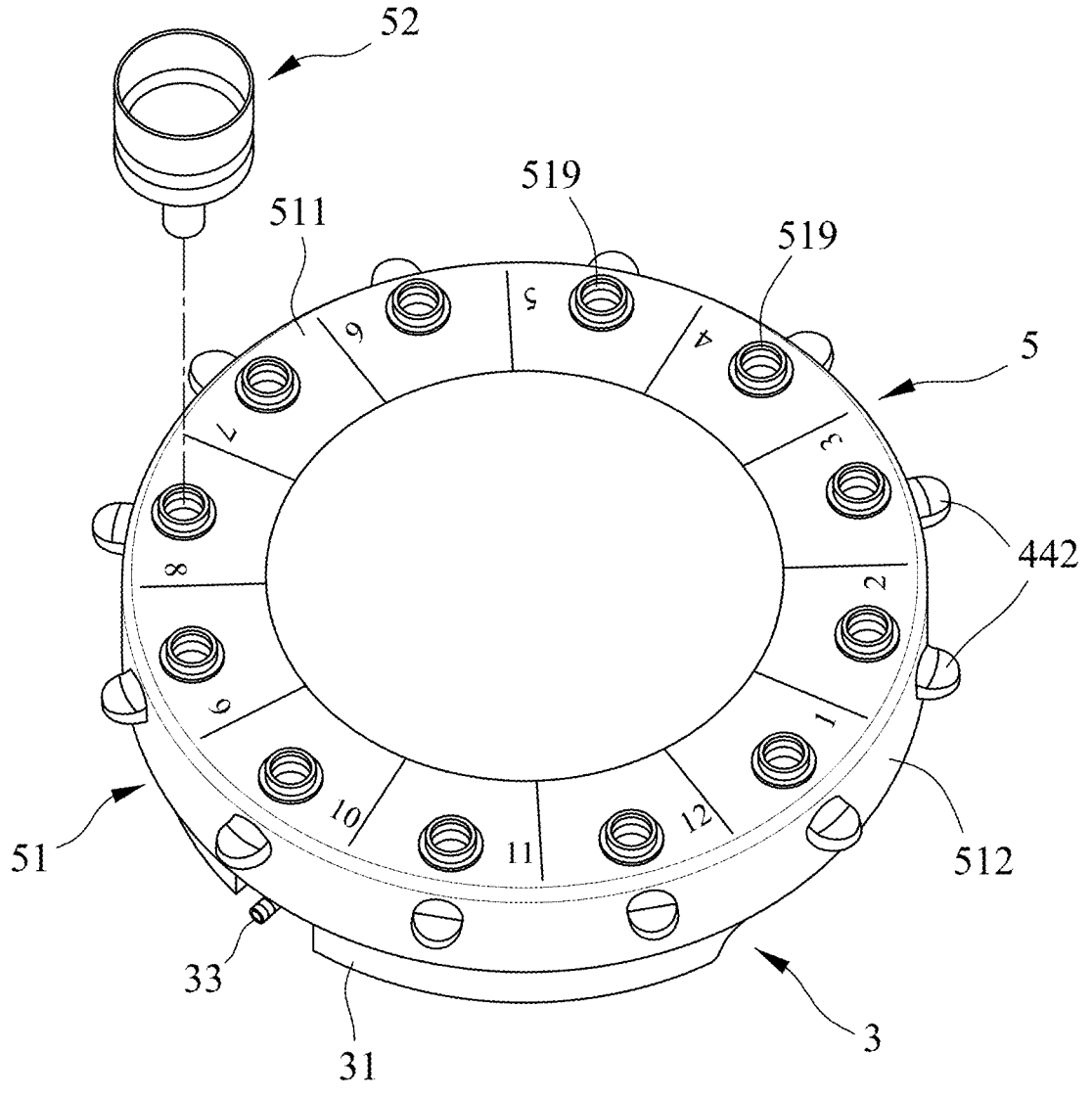
FIG. 2 is a fragmentary, partly exploded perspective view illustrating an embodiment of a rotatable filter according to the disclosure.
Figure 3:
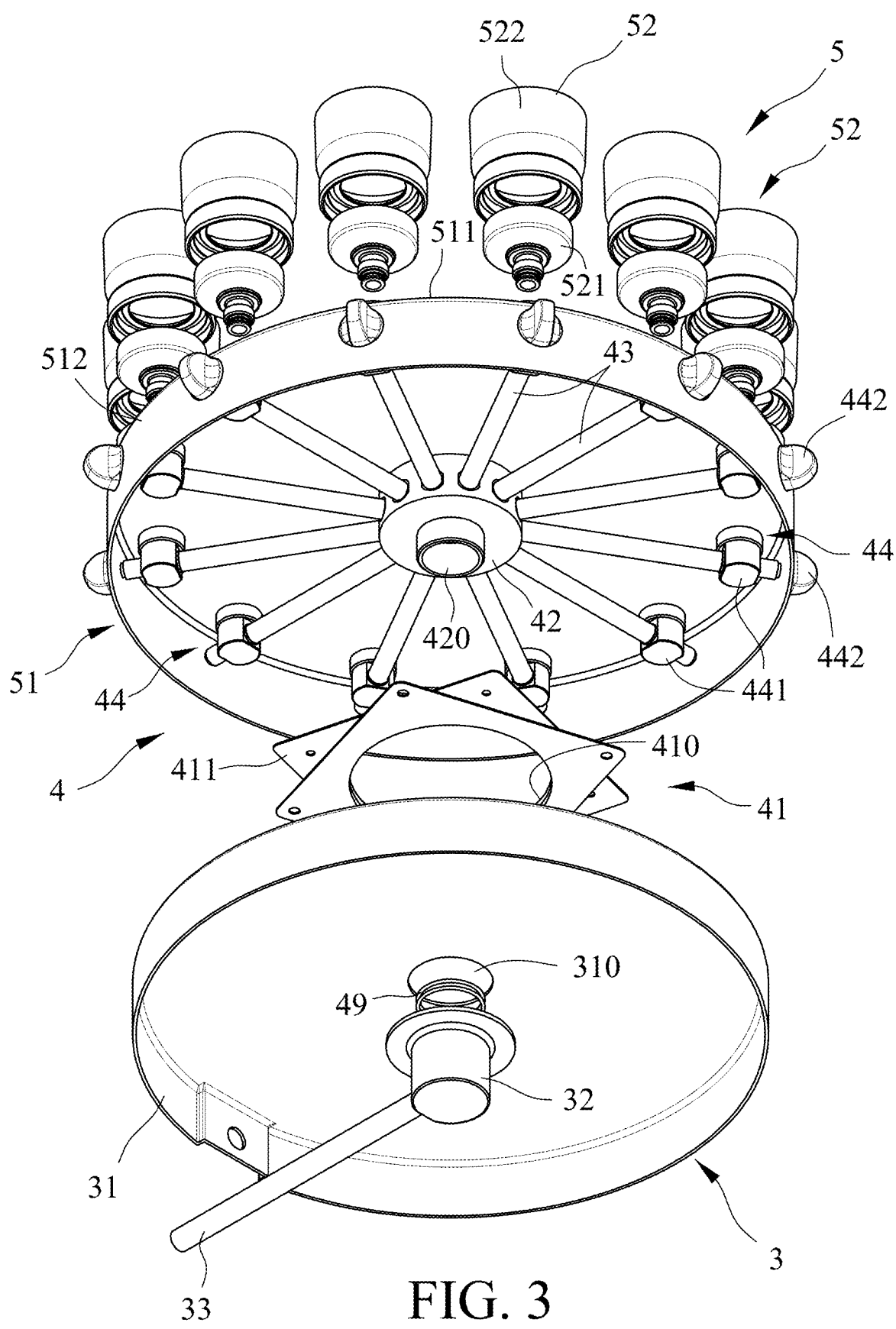
FIG. 3 is a partly exploded perspective bottom view illustrating the embodiment of the rotatable filter according to the disclosure.

Referring to FIGS. 2 and 3, an embodiment of a rotatable filter according to the disclosure includes a base unit 3, a rotating unit 4 that is disposed on the base unit 3, and an external unit 5 that is connected to the rotating unit 4. In this embodiment, the rotatable filter is exemplarily used to filter a certain amount of fluid and collect the filtered fluid in order to exhibit features of the disclosure, but the implementation of this embodiment is not limited thereto.

Figure 4:
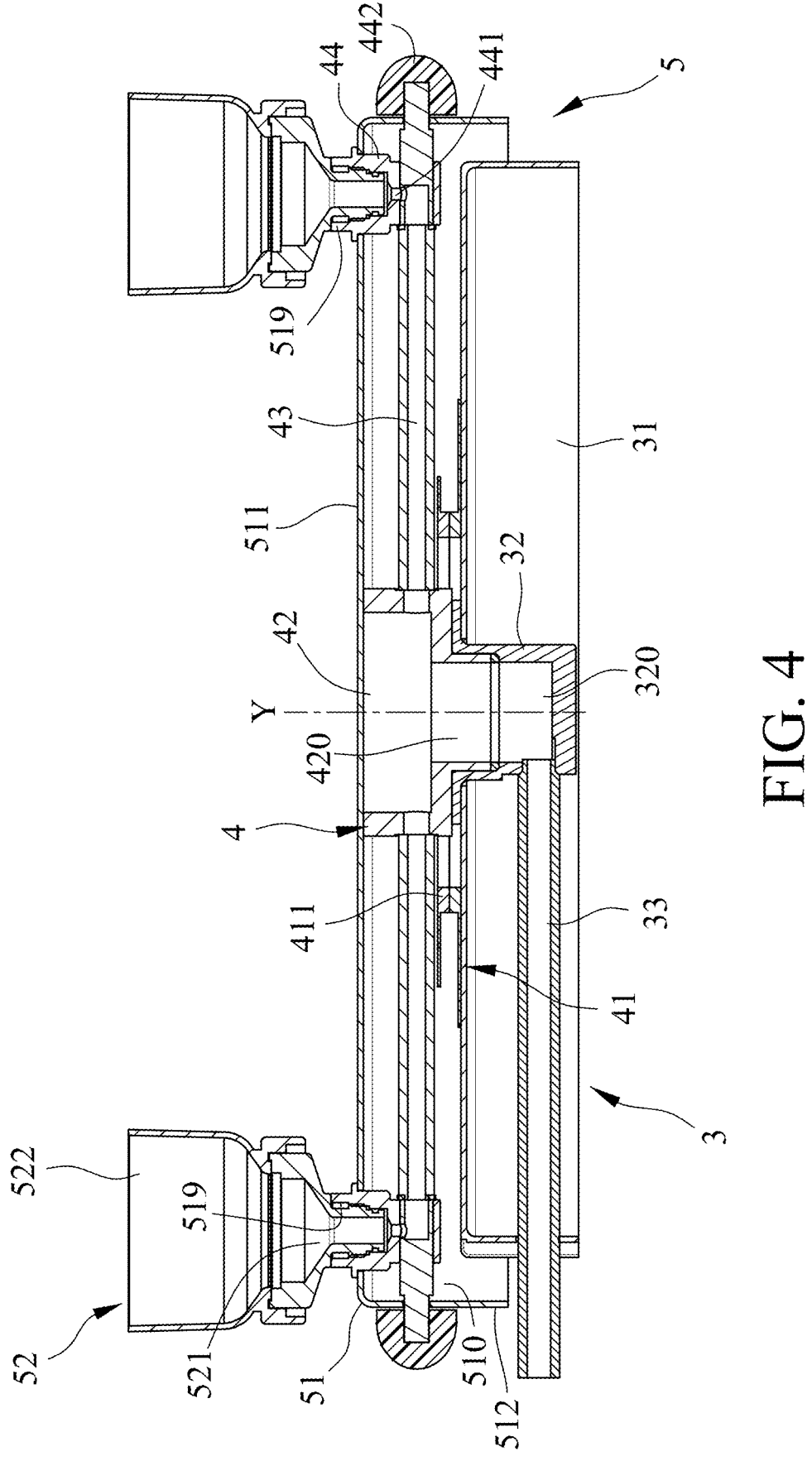
FIG. 4 is a fragmentary, cross-sectional view illustrating the embodiment of the rotatable filter according to the disclosure.

Referring to FIGS. 3 and 4, the base unit 3 includes a seat 31 that has a through hole 310, a container 32 that is disposed on the seat 31, that corresponds in position to the through hole 310 and that has a drainage space 320, and a drain pipe 33 that is in fluid communication with the drainage space 320. The seat 31 has a substantially round shape and serves as a base of this embodiment, and the through hole 310 corresponds in position to a central axis (Y) of the rotatable filter. The container 32 collects the filtered fluid and the drain pipe 33 guides the filtered fluid to downstream equipment (not shown).

The rotating unit 4 includes a rotating disc 41 that is mounted on the seat 31 and that includes a rotating part 411 which is rotatable relative to the seat 31, a converging seat 42 that is connected to the rotating part 411 of the rotating disc 41, that is coupled with the container 32 and that has a collecting space 420 which is in fluid communication with the drainage space 320, a plurality of guiding pipes 43 that extend into the converging seat 42 and that are in fluid communication with the collecting space 420, and a plurality of valve seats 44 that are respectively disposed on the guiding pipes 43. Each of the valve seats 44 of the rotating unit 4 includes a valve body 441 and a knob 442 that is connected to the valve body 441 and operable to open and close a path of fluid in the valve body 441. The rotating disc 41 is formed with an opening 410 for the converging seat 42 to extend therethrough, and the converging seat 42 is coupled to the container 32 with a rubber ring 49 (e.g., an O-ring) disposed between the converging seat 42 and the container 32 to seal an interface therebetween, so that the collecting space 420 of the converging seat 42 is in fluid communication with the drainage space 320 in a substantially watertight manner. Furthermore, for each of the valve seats 4, the valve body 441 controls fluid to flow into the corresponding one of the guiding pipes 43 through operation of the knob 442.

The external unit 5 includes a rotating cover 51 that is disposed above the seat 31, that is rotatable together with the rotating part 411 about the central axis (Y) and that has an accommodating space 510 for accommodating the rotating unit 4, and a plurality of filtering modules 52 that are disposed on the rotating cover 51. The rotating cover 51 of the external unit 5 has a circular top surface 511, a sidewall 512 that extends downward from an outer periphery of the top surface 511, and a plurality of receiving slots 519 that surround the central axis Y, that are spaced apart from each other and that are respectively in fluid communication with the valve seats 44. The filtering modules 52 are detachably and respectively disposed on the receiving slots 519. In this embodiment, there are twelve filtering modules 52 and twelve receiving slots 519. Each of the filtering modules 52 includes an adapter 521 detachably inserted into a corresponding one of the valve seats 44 via the respective one of the receiving slots 519, and a filtering cup 522 detachably connected to the adapter 521 and configured to filter fluid from a fluid container (not shown). The filtering cup 522 may come in various shapes, and by changing the shape of the filtering cup 522, each of the filtering modules 52 is adapted for being used with different types of fluid containers, which enhances practicality of this embodiment.

Figure 5:
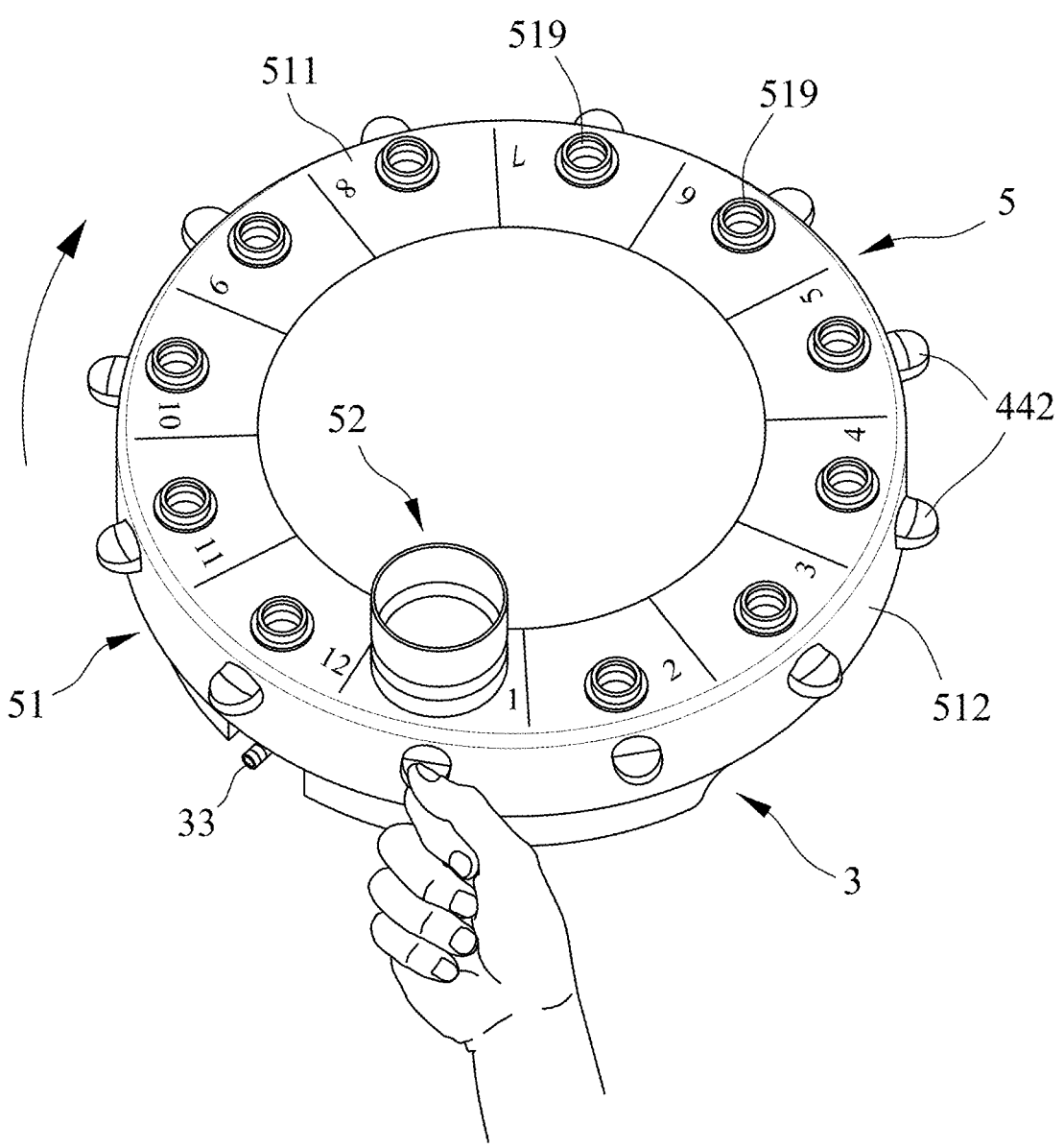
FIG. 5 is a fragmentary perspective view illustrating operation of the embodiment of the rotatable filter according to the disclosure.

Referring to FIG. 5 in reference with FIG. 4, the knobs 442 of the valve seats 44 of the rotating unit 4 are equally spaced apart from each other and are disposed on a side of the sidewall 512 of the rotating cover 51 opposite to the accommodating space 510. Accordingly, in addition to rotating the rotating cover 51 to conveniently access each of the filtering modules 52 even when the user is in a fixed position, with accessibility of one of the knobs 442 in front of the user to open or close the path of fluid in the corresponding valve body 441, the user may readily control whether to allow the filtered fluid to be guided to the collecting space 420 via the corresponding guiding pipe 43 and further to the drainage space 320. After the filtering process, the filtered fluid in the drainage space 320 is guided to downstream equipment via the drain pipe 33.

Figure 6:
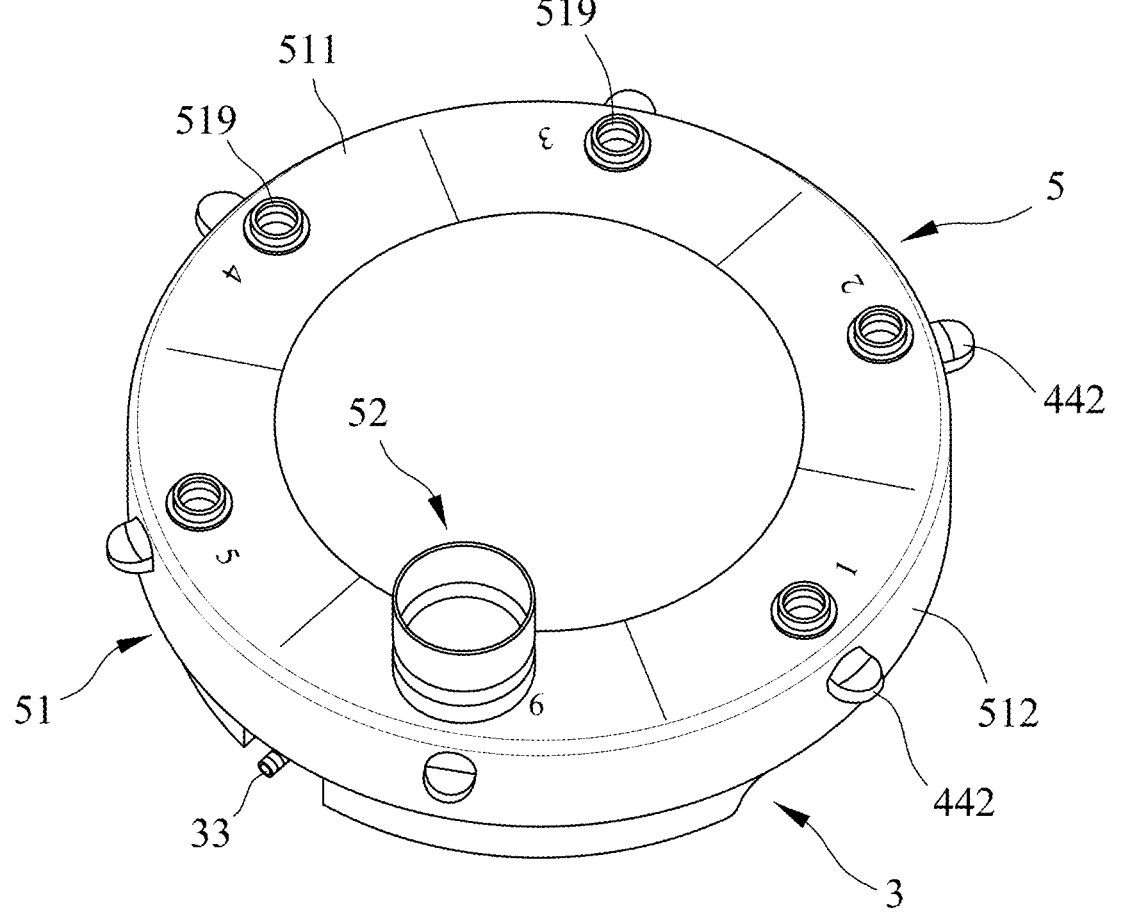
FIG. 6 is a fragmentary perspective view illustrating another embodiment of the rotatable filter according to the disclosure.

Referring to FIG. 6, another embodiment of a rotatable filter of the disclosure differs from the embodiment in FIG. 2 in that the rotating cover 51 of the external unit 5 of the another embodiment includes six receiving slots 519, i.e., the another embodiment is a rotatable filter which includes six filtering modules 52 (only one is depicted in FIG. 6). In practice, a total number of the filtering modules 52 and a total number of the receiving slots 519 on the rotating cover 51 may be decided based on actual demand. With a sufficient number of filtering modules 52 and the rotatable filter being operable in a conveniently rotatable manner, the effects of the disclosure are achieved.

In summary, in the embodiments of the rotatable filter of the disclosure, different numbers of the filtering modules 52 can be installed based on actual demand depending on the amount of sample (e.g., fluid). Besides, the external unit 5 is rotatable together with the rotating disc 41 of the rotating unit 4, so the user can stay in a fixed position, rotate the rotating cover 51 of the external unit 5 to access each of the filtering modules 52 and use the corresponding knobs 442 to carry out the operation. Therefore, the operation is more efficient and convenient and the object of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A rotatable filter, comprising:

a base unit that includes a seat having a through hole, and a container disposed on said seat, corresponding in position to said through hole and having a drainage space, a rotating unit that is disposed on said base unit, and that includes a rotating disc mounted on said seat and having a rotating part which is rotatable relative to said seat, a converging seat connected to said rotating part of said rotating disc and having a collecting space which is in fluid communication with said drainage space, a plurality of guiding pipes extending into said converging seat and in fluid communication with said collecting space, and a plurality of valve seats respectively disposed on said guiding pipes, and an external unit that is connected to said rotating unit, and that includes a rotating cover disposed above said seat, rotatable together with said rotating part about a central axis, and having an accommodating space for accommodating said rotating unit, and a plurality of filtering modules disposed on said rotating cover; wherein said rotating cover includes a plurality of receiving slots that surround the central axis, that are spaced apart from each other and that are respectively in fluid communication with said valve seats, and said filtering modules are detachably and respectively disposed on said receiving slots.

2. The rotatable filter as claimed in claim 1, wherein a total number of said plurality of receiving slots of said rotating cover is twelve, and a total number of said plurality of filtering modules of said external unit is twelve.

3. The rotatable filter as claimed in claim 1, wherein a total number of said plurality of receiving slots of said rotating cover is six, and a total number of said plurality of filtering modules of said external unit is six.

4. The rotatable filter as claimed in claim 1, wherein each of said filtering modules of said external unit includes an adapter that is detachably inserted into a corresponding one of said valve seats via the respective one of said receiving slots, and a filtering cup that is detachably connected to said adapter.

5. The rotatable filter as claimed in claim 1, wherein said base unit further includes a drain pipe that is in fluid communication with said drainage space.

6. The rotatable filter as claimed in claim 1, wherein each of said valve seats of said rotating unit includes a valve body, and a knob that is connected to said valve body and that is operable to open and close a path of fluid in said valve body.

7. The rotatable filter as claimed in claim 6, wherein said rotating cover of said external unit has a circular top surface and a sidewall that extends downward from an outer periphery of said top surface.

8. The rotatable filter as claimed in claim 7, wherein said knobs of said valve seats of said rotating unit are equally spaced apart from each other and are disposed on a side of said sidewall of said rotating cover that is opposite to said accommodating space.

* * * * *